United States Patent
Mese et al.

(10) Patent No.: US 9,501,632 B2
(45) Date of Patent: Nov. 22, 2016

(54) VISUAL AUTHENTICATION TO A COMPUTING DEVICE

(71) Applicant: LENOVO (Singapore) PTE, LTD., New Tech Park (SG)

(72) Inventors: John Carl Mese, Cary, NC (US); Nathan J. Peterson, Durham, NC (US); Arnold S. Weksler, Raleigh, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 78 days.

(21) Appl. No.: 14/015,572

(22) Filed: Aug. 30, 2013

(65) Prior Publication Data
US 2015/0067825 A1 Mar. 5, 2015

(51) Int. Cl.
G06F 21/00 (2013.01)
G06F 21/36 (2013.01)

(52) U.S. Cl.
CPC ..................................... *G06F 21/36* (2013.01)

(58) Field of Classification Search
CPC ........................................................ G06F 21/36
USPC .................................. 726/2–4, 16, 17, 19, 21
See application file for complete search history.

(56) References Cited

U.S. PATENT DOCUMENTS

| | | | |
|---|---|---|---|
| 6,195,698 B1 * | 2/2001 | Lillibridge et al. | 709/225 |
| 8,542,251 B1 * | 9/2013 | Gossweiler et al. | 345/649 |
| 8,621,396 B1 * | 12/2013 | Gossweiler, III | 715/863 |
| 2004/0093527 A1 * | 5/2004 | Pering | G06F 21/36 726/5 |
| 2004/0199597 A1 * | 10/2004 | Libbey et al. | 709/207 |
| 2010/0180336 A1 * | 7/2010 | Jones | H04L 9/3226 726/19 |
| 2011/0298691 A1 * | 12/2011 | DeLuca et al. | 345/1.3 |
| 2012/0291108 A1 * | 11/2012 | Talamo et al. | 726/6 |
| 2012/0324570 A1 * | 12/2012 | Taniuchi | 726/19 |
| 2013/0167212 A1 * | 6/2013 | Azar | G06F 21/32 726/7 |
| 2013/0251212 A1 * | 9/2013 | Leddy | G06K 9/6206 382/115 |
| 2013/0344859 A1 * | 12/2013 | Abramson et al. | 455/418 |
| 2014/0130148 A1 * | 5/2014 | Sako | G06F 21/36 726/19 |
| 2014/0359653 A1 * | 12/2014 | Thorpe | G06F 21/00 725/30 |

\* cited by examiner

*Primary Examiner* — John B King
(74) *Attorney, Agent, or Firm* — Kunzler Law Group

(57) ABSTRACT

For visually authenticating to a computing device, a method is disclosed that includes receiving an authentication request at a computing device, displaying a dynamic visual signal in response to the authentication request, wherein the visual signal suggests an authentication token. The method also includes receiving the authentication token in response to displaying the dynamic visual signal, and determining if the authentication token satisfies authentication requirements at the computing device.

15 Claims, 11 Drawing Sheets

VISUAL AUTHENTICATION TO A COMPUTING DEVICE

FIELD

The subject matter disclosed herein relates to using a computing device and more particularly relates to authenticating against a computing device.

BACKGROUND

Description of the Related Art

In general, computing devices may be used for a wide variety of purposes. Computing devices typically include some form of authentication so that a user of the computing device may restrict others from accessing the computing device. Authentication methods may include typing a password, entering a numerical sequence, unique swipe patterns at a touchscreen, or swiping a touchscreen at a predetermined location.

Although these methods may provide some security, other users who may wish to bypass this method of authentication may view smudge marks on a touchscreen. The smudge marks may indicate relevant touch locations, touch patterns, or similar that may provide another user with enough information to enter an authentication token.

Furthermore, another user may watch the owner of the computing device login from a distance. This may also allow a user to repeat an observed action in order to enter an authentication token. A device owner may combat this type of activity by either cleaning a screen after each login attempt, or visually obscuring the device when authenticating to it, however, these types of actions are inconvenient and difficult to do consistently.

BRIEF SUMMARY

An apparatus for visually authenticating to a computing device is disclosed. A method and computer program product also perform the functions of the apparatus. In one embodiment, an apparatus includes a display module configured to present a dynamic visual signal in response to the authentication request. In a further embodiment, the dynamic visual signal may suggest an authentication token. In one embodiment, the apparatus may include an authentication module configured to receive the authentication token. In another embodiment, the authentication module may be further configured to determine if the provided authentication token satisfies authentication requirements at the apparatus.

In one embodiment, the apparatus may include a generation module configured to generate a dynamic visual signal in response to receiving the authentication request. In another embodiment, the dynamic visual signal may include two or more images displayed in sequence. In a further embodiment, one of the two or more images may suggest the authentication token.

In one embodiment, a dynamic visual signal may include modifications to one image of two or more images. In another embodiment, the modifications may include altering a size of the image. In another embodiment, the modifications may include altering a location of the image. In another embodiment, the modifications may include altering an orientation of the image. In another embodiment, the modifications may include altering a background color of the image. In another embodiment, the modifications may identify one image that may suggest the authentication token.

In one embodiment, images included in a dynamic visual signal may be received from a remote server. In another embodiment, the dynamic visual signal includes an image displaying a modified keyboard. In a further embodiment, the modified keyboard includes a rotated keyboard. In one embodiment, the modified keyboard includes a keyboard with modified keys. In a further embodiment, the modified keyboard includes a keyboard with a modified size. In one embodiment, the visual signal suggests a sequence of touches at a touchscreen of the apparatus. In another embodiment, the authentication token comprises the sequence of touches. In a further embodiment, the authentication token comprises time delays between touches of the sequence.

A method is disclosed that visually authenticates to a computing device. In one embodiment, the method includes receiving an authentication request at a computing device. In another embodiment, the method includes displaying a dynamic visual signal in response to the authentication request, the visual signal suggesting an authentication token. In a further embodiment, the method includes receiving the authentication token in response to displaying the dynamic visual signal. In one embodiment, the method includes determining if the authentication token satisfies authentication requirements at the computing device.

In one embodiment, the method includes generating the dynamic visual signal in response to receiving the authentication request, the dynamic visual signal being different than a previous dynamic visual signal associated with a previous authentication request. In another embodiment, generating the dynamic visual signal includes modifying the one image of the two or more images by one of altering a size of the image, altering a location of the image, altering an orientation of the image, and altering a background color of the image, the modification identifying the one of the two or more image suggesting the authentication token.

In one embodiment, generating the dynamic visual signal includes generating an image of a modified keyboard, the modification including moving keys of the keyboard to alternate locations compared with previous authentication requests. In another embodiment, the dynamic visual signal includes two or more images, one of the two or more images suggesting the authentication token. In a further embodiment, the authentication token includes a sequence of touches at a touchscreen of the apparatus, the sequence of touches incorporating time delays between respective touches.

A program product comprising a computer readable storage medium storing machine readable code executable by a processor to perform operations is disclosed. In one embodiment, the operations include receiving a request to authenticate to a computing device. In another embodiment, the operations include displaying a unique visual signal in response to the authentication request, the unique visual signal comprising two or more images wherein one of the two or more images suggests the authentication token. In a further embodiment, the operations include receiving an authentication token in response to displaying the unique visual signal. In one embodiment, the operations include authenticating to the computing device using the authentication token.

In another embodiment, the operations further include generating the unique visual signal, the unique visual signal including modifications to the one of the two or more images suggesting the authentication token. In one embodiment, the modifications comprise one of altering a size of the image, altering a location of the image, and altering an orientation of the image, and altering a background color of the image, the modifications identifying the one of the two or more image suggesting the authentication token.

In one embodiment, unique visual signal comprises an image displaying a modified keyboard, the modifications comprising one of modifying the location of the keyboard, modifying a rotation of the keyboard, modifying the order of keys of the keyboard, and modifying the size of the keyboard. In another embodiment, the authentication token includes a sequence of touches at a touchscreen of the apparatus, the sequence of touches including one or more time delays between touches of the sequence.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
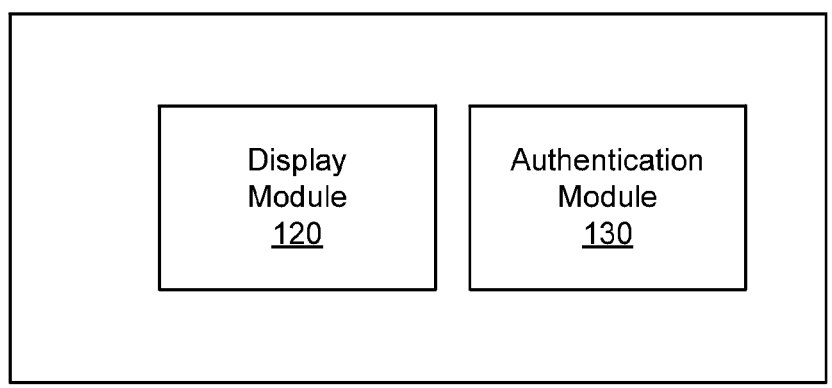
FIG. 1 is a schematic block diagram illustrating one embodiment of an apparatus for visually authenticating to a computing device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements. In order to address the current state of the art, the present application disclose several embodiments of a method, system, and apparatus for creating a custom series of commands.

A computing device, as used herein, means at least a device capable of performing logic operations. A computing device may include a processor, several processors, a multi-core processor, memory, a screen, or the like. For example, a computing device, may be a personal computer, a handheld computer, a mobile device, a cellular phone, a tablet computer, a laptop computer, or other, or the like. A computing device may also include a touchscreen for detecting various types of touches. For example, a touchscreen may detect a single touch, a drag touch, multiple concurrent touches, or any combination of touches, or the like.

FIG. 1 is a schematic block diagram illustrating one embodiment of an apparatus for visually authenticating to a computing device. In one embodiment, the apparatus includes a display module 120, and an authentication module 130.

In one embodiment, a computing device may be used by a user. In response to not receiving any input from a user for some period of time, a computing device may enter a secure mode. In another embodiment, a user may issue a command to the computing device to enter secure mode. For example, a user may press a "lock" button, press a physical button on the computing device, issue a voice command, issue a gesture command, or other, or the like.

In one embodiment, the apparatus 100 may include a display module 120. A display module 120 may be configured to present a dynamic visual signal in response to the authentication request. In another embodiment, the dynamic visual signal may suggest an authentication token. In one embodiment, a user of the computing device may provide an authentication token based on the dynamic visual signal. In another embodiment, the dynamic visual signal may be unique compared with previous dynamic visual signals.

In one embodiment, a dynamic visual signal may include an image. In one embodiment, a display module 120 may modify presentation of the image. The image may suggest an authentication token to a user. In one example, an authentication token may include a double-click, or a double-tap in the middle of an image. A display module 120 may alter a location of the image to be displayed. Therefore, a display module 120 may present a dynamic view of the image because the image may be presented in a different location for respective login attempts. Therefore, in one embodiment, a display module may present a unique visual signal for each authentication attempt.

In one embodiment, a display module 120 may present the image in a different location each time a user requests to authenticate to the computing device. In one example, a display module 120 may present the image in a lower left portion of a display screen for the computing device. In another example, the display module 120 may present the image in an upper right portion of a display screen for the computing device. In another example, a display module 120 may present the image in the middle of a display for a computing device.

In another embodiment, a display module 120 may present a dynamic visual signal by altering a rotation of an image. In one embodiment, a user may provide an authentication token by swiping from a bottom left to a top right of a display image (according to the orientation of the image). In one example, a display module 120 may rotate an image counter-clockwise by 90 degrees. Therefore, instead of swiping from a bottom left to a top right of the display image, because the image is rotated, a user may provide the authentication token by swiping from a bottom-right to a top-left of the display image. In this example, a swipe from a bottom=left to a top-right would not provide the correct authentication token, because the image had been rotated by the display module 120.

Therefore, by providing a dynamic visual signal, a user of the computing device may still provide an authentication token having knowledge of the authentication method. Another user, may observe swipe marks on a screen, and may duplicate them. In this example, a subsequent authentication attempt may fail because the subsequent authentication token is different because of the dynamic nature of the authentication image (the image having been rotated, or moved, or the like). Furthermore, another user may observe a swipe by the user of the computing device, and may attempt to authenticate to the computing device by performing an identical swipe. However, in this example, a subsequent authentication, even if exactly duplicated, may fail because of a dynamic nature of the authentication image. Therefore, a display module may present a dynamic visual signal in response to an authentication request, and a dynamic visual signal may enhance security of providing an authentication token based on a dynamic visual signal.

In another embodiment, a display module 120 may present a dynamic visual signal by resizing an authentication image. In one embodiment, a user may provide an authentication token by drawing a square around the borders of an authentication image. In one example, a display module 120 may present a larger or a smaller version of an authentication image. Therefore, an authentication token may be different for each authentication attempt due to a different size of an authentication image. In this example, another user may duplicate an observed or detected action by an original user of a computing device, however, the subsequent authentication attempt may fail because the size of the authentication image is different. This may be the case, even where another user exactly duplicates a square at the screen of the computing device.

In another embodiment, a display module 120 may present a dynamic visual signal in response to an authentication request by performing any other modifications to an authentication image. In one embodiment, a display module 120 may present a dynamic visual signal by performing many modifications to an authentication image. For example, a display module 120 may rotate an authentication image and resize an authentication image.

In another embodiment, a display module 120 may present a dynamic visual signal comprising two or more images displayed in a sequence wherein one of the two or more images suggest the authentication token. Therefore, an owner of the apparatus 100 may recognize the authentication image suggesting the authentication token, however, another user of the apparatus may not recognize the authentication image. Because a sequence of images may include one authentication image and many non-authentication images, another user may not know which image to authenticate against, or when to enter an authentication token.

In another embodiment, a display module 120 may present a dynamic visual signal by displaying a video. The video may include many pictures displayed in a sequence at regular intervals. In one example, the video may include 10 frames, or pictures per second, however this application is not limited in this regard as one skilled in the art may recognize that other frame rates may be used to display a video. In another embodiment, an audio signal may be incorporated into the video. In one embodiment, the video may include one authentication image. In another embodiment, the video may include more than one authentication image. Therefore, a user may enter an authentication token based on any of the authentication images in a video.

In another embodiment, a display module 120 may present a dynamic visual signal in response to an authentication request by displaying many images in an array on a display of a computing device. In one embodiment, a user may have identified an authentication image to click. A display module 120 may rearrange the many images on the display of the computing device in a random fashion. Therefore, in one embodiment, the authentication image (being one of the many display images) may be in a different location for each authentication attempt. Therefore, as previously described, another user of the computing device that may duplicate an authentication token at the computing device by observing an action by the owner of the computing device, may fail because the authentication image may be at a different location.

In another embodiment, many images may be displayed in random locations on the screen, and not ordered, and not organized, and not being in rows or columns. Therefore, an owner of the computing device may recognize an authentication image, whereas another user of the computing device may not recognize an authentication image. Therefore, a display module 120 may present a dynamic visual signal by displaying many images in different locations via a display of the computing device.

In another embodiment, an owner of a computing device may configure an authentication token to be associated with an image with a certain feature. For example, an authentication image may include an image with three people. Therefore, in one embodiment, a dynamic visual signal displayed by a display module 120 may include images that the computing device owner has not previously seen. An owner of the computing device 120 may recognize the authentication image, based on the feature of the image, although the owner may have never seen the image previously.

In one example, a feature of an authentication image may include a specified background color. Therefore, a display module 120 may present many images, and an owner of the computing device may recognize the authentication image based on the background color, and perform an authentication token on the authentication image. However, another user, may not recognize an authentication feature of an authentication image, and may not know which authentication image of the many display images to use for entering the authentication token. Therefore, another user may perform an exact duplicate of a previous authentication token, however, the authentication may fails because subsequent authentication attempts may include the authentication image being at a different location, or may be a different authentication image altogether (although the other authentication image would share a similar feature, such as, but not limited to, a background color, a location of an object in the image, a number of people in the image, or other, or the like).

In one embodiment, a user may expect to recognize features of images presented during an authentication attempt, but may not recognize the actual images being displayed. Therefore, in one embodiment, a computing device may present unknown images for authentication and a user may still provide an authentication token based on recognized features of images instead of actual images. In another embodiment, a display module 120 may receive images from a remote server. In one embodiment, a remote authentication server may provide images that include certain features.

For example, a remote server may provide images with specified background images, or may provide images with a black dot at a given location in the image. Therefore, a display module 120 may receive images from a remote server for authentication, and a user may provide an authentication token based on recognized features of images not before seen by the user. Of course, one skilled in the art may recognize a wide range of recognizable features in an image including, but not limited to, automobiles in an image, a number of cars in an image, a number of people in an images, a smiling face in an image, a lake in an image, rain in an image, a recognizable character in an image, a recognizable location in an image, or other, or the like.

In another embodiment, an authentication token may include a sequence of clicks identifying a sequence of images. In one embodiment, a display module 120 may present many images in response to an authentication request. A user may provide an authentication token by clicking on a sequence of images. A display module 120, in one embodiment, may rearrange the images for each authentication attempt. Therefore, another user of the computing device may fail to authenticate to the computing device although the user may duplicate a previous authentication token (because the authentication images are in different locations).

In one example, a user may identify a single authentication image and perform an authentication token on the authentication image when the image appears in the sequence. In another embodiment, a user may identify several authentication images and perform an authentication token on several images. For example, where a sequence includes five images, and images number two and number three are authentication images, a user may touch a touchscreen when images two and three are displayed, but may not touch a touchscreen when other images are displayed.

In another embodiment, a display module 120 may present a series of images. An authentication token may include one or more clicks, touches, taps, swipes, drags, etc. on recognized images in the series (or recognized features of images as previously described). An owner of the computing device may recognize the images that are part of the authentication token, however, another user may not. Therefore, another user may fail to authenticate to the computing device, although the another user may duplicate an observed authentication by the owner of the computing device from a previous authentication attempt.

In another embodiment, a display module 120 may present a video via a display of a computing device. In one embodiment, a user may provide an authentication token in response to viewing the video. In one embodiment, a user may provide an authentication token at a specified time sequence in the video. For example, a video that may display a car driving may include a car passing a road sign. A user may perform an authentication token at substantially the same time, or concurrently with the car passing the road sign. Therefore, in one embodiment, an authentication token may require a time delay from the beginning of a dynamic visual signal and reception of an authentication token.

In one embodiment, an apparatus 100 may include an authentication module 130. An authentication module, in another embodiment may be configured to receive an authentication token. In another embodiment, the authentication module 130 may be further configured to determine if the provided authentication token satisfies authentication requirements at the apparatus 100.

In one embodiment, a display module 120 may modify authentication requirements based on similar modifications to an authentication image. For example, where an authentication token includes swiping from a bottom left to a top right of an image, and a display module rotated the image, an authentication requirement may be modified based on the rotation of the image. Therefore, where an authentication image had been rotated 180 degrees, an authentication requirement may be modified from a swipe from a bottom left to a top right of an authentication image to swiping from a top right to a bottom left of the authentication image (where the image is now 180 degrees rotated).

As described here, an authentication token may include any action or series of actions by a user to authenticate to a computing device. An authentication token may include a certain input to a computing device. For example, an authentication token may include clicking with a mouse at certain intervals or locations based on a dynamic visual signal. In another example, an authentication token may include touching a touchscreen, or performing touch motions at a touchscreen in response to a display module 120 providing a visual signal. In one embodiment, an authentication token may include one or more swipes, taps, touches, drags, shakes, motions, or any other action, or series of actions that may input to a computing device.

In one embodiment, an authentication token may include a passphrase. A passphrase may be provided by a user by pressing keys on a keyboard, touching virtual keys at a touchscreen, or the like. In another embodiment, an authentication token may include a numerical sequence. For example, a user may enter a series of numbers via a keyboard, or a virtual keyboard, another input device, or the like. In another embodiment, an authentication token may include a number of clicks or touches at a computing device. For example, an authentication token may include five touches at a bottom left portion of a display screen at a computing device. Other examples include various swipes at a touchscreen, various touches at a touchscreen, other touches at a touchscreen, certain sequences of keys via a physical keyboard or a virtual keyboard, various gestures that may be received at a computing device via a gesture sensor, a received audio signal, a camera input, a microphone, or other, or the like.

In another embodiment, an authentication module 130 may modify an authentication token in response to similar modification to an authentication image. For example, where a display module 120 modifies an authentication image by rotating the authentication image 100 degrees clockwise, an authentication module 130 may correspondingly modify an authentication token by rotating the authentication token 100 degrees clockwise. Therefore, in one embodiment, an authentication image, or a dynamic visual signal may be modified, and an authentication token may be similarly modified.

Figure 2:
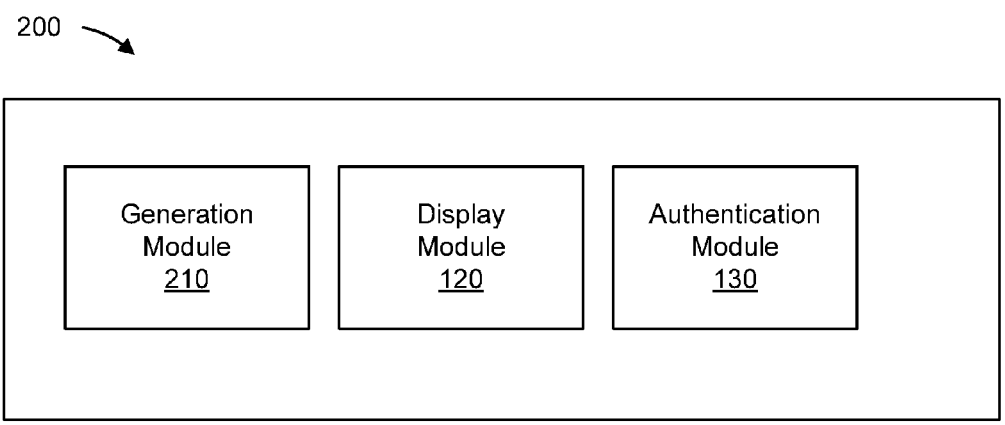
FIG. 2 is another schematic block diagram illustrating one embodiment of an apparatus for visually authenticating to a computing device.

FIG. 2 is another schematic block diagram illustrating one embodiment of an apparatus 200 for visually authenticating to a computing device. In one embodiment, the apparatus includes a display module 120, an authentication module 130, and a generation module 210. The display module 120, and the authentication module 130 may or may not be substantially similar to similar modules depicted in FIG. 1.

In one embodiment, the apparatus 200 may include a generation module 210. A generation module 210 may be configured to generate a dynamic visual signal in response to an authentication request. In one embodiment, the dynamic visual signal may be unique, or may be different than a previous dynamic visual signal associated with a previous authentication request. In another embodiment, a generation module 210 may perform similar functions as the display module 120 of FIG. 1.

In one embodiment, a generation module 210 may construct a visual signal based on authentication images. A generation module 210 may generate a visual signal that displays authentication images in a sequence. The sequence may include other images that are not authentication images. In one embodiment, a user may enter a portion of an authentication token on one of the authentication images in the video, and another portion of an authentication token on another one of the authentication images in the video. In one embodiment, the video may include authentication images displayed at regular intervals. In another embodiment, a generation module 210 may generate a visual signal that includes authentication images display at irregular intervals. For example, a generation module 210 may generate a visual signal including authentication images being displayed at 1 second intervals, or having one second between authentication images.

In another embodiment, a generation module 210 may perform similar functions as a display module 120. In one embodiment, a generation module 210 may modify an authentication image in one or more fashions. Modifications to an authentication image may include, resizing the image, rotating the image, relocating an image, combining multiple images, overlaying one image over another image, modifying a background color of an image, or the like.

Figure 3:
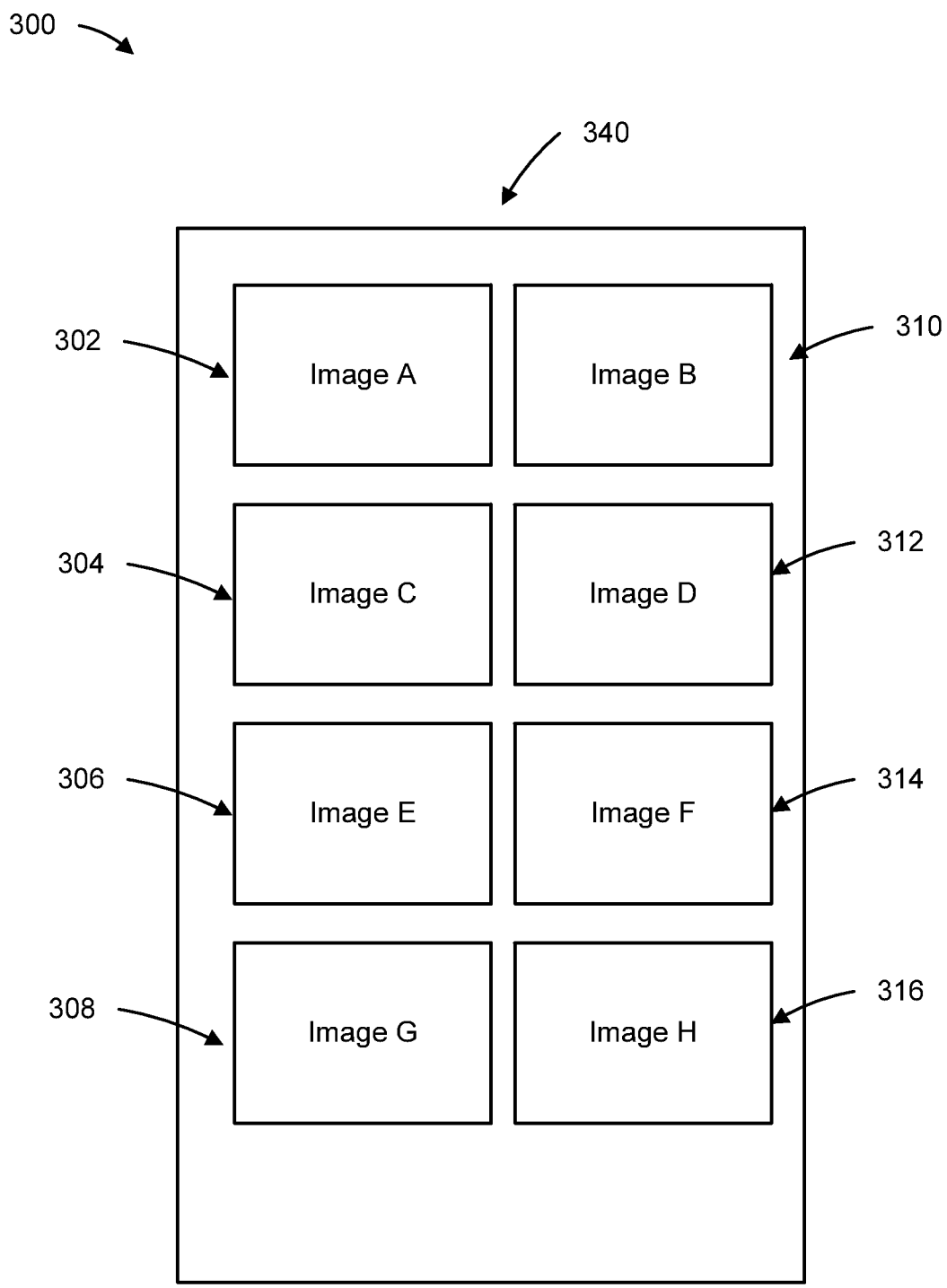
FIG. 3 is an illustration depicting one embodiment of an apparatus displaying a dynamic visual signal.

FIG. 3 is an illustration depicting one embodiment 300 of an apparatus displaying a dynamic visual signal. As previously described, a display module 120 may present a dynamic visual signal including an array of images. In one embodiment, one or more of the images may be authentication images. Others in the array of images may not be authentication images.

An authentication image, as described herein, may include an image that suggests an authentication token to a user of a computing device. In one embodiment, an authentication image may be an image whereon a user may perform an authentication action. For example, an array of two images may include one authentication image and one image that is not an authentication image. A user may authenticate with the computing device by entering an authentication token on the authentication image, but may not authenticate with the computing device by entering a similar authentication token on the other image that is not an authentication image. Therefore, in an array of images, one or more may be authentication images, and the array may also include images that are not authentication images.

In one embodiment, a computing device may include a display 340. The display 340 may display eight images in an array as depicted in FIG. 3. In one embodiment, one image in the array may be an authentication image and others in the array may not be authentication images. For example, Image A 302 may be an authentication image, whereas images B-H (302, 304, 306, 308, 310, 312, 314, 316) may not be authentication images.

In one embodiment, in order to authenticate to the computing device, a user may perform an authentication action on the authentication image. For example, a user may perform a swipe across the authentication image. If the user performs a similar swipe on an image that is not an authentication image, the user may fail to authenticate to the computing device.

In another embodiment, two or more images in the array may be authentication images. For example, images A 302 and H 316 may be authentication images, whereas images B-G (304, 306, 308, 310, 312, 314) may not be authentication images. In one embodiment, a user may provide a portion of an authentication token on image A 302 and another portion of the authentication token on image H. For example, an authentication token may include a swipe on a touchscreen from image A to image H. In another example, images D 312 and G 308 may be authentication images and the authentication token may be a swipe from image D 312 to image G 308. Of course, other authentication tokens may be used.

In another embodiment, more than two images may be authentication images. For example, images B 310, E 306 and C 304 may be authentication images and an authentication token may include double clicking/tapping on each of the authentication images. As previously described, a generation module 210 may generate a random ordering of the authentication images and non-authentication images. In another embodiment, each authentication attempt may yield a different ordering of images in the array.

Figure 4:
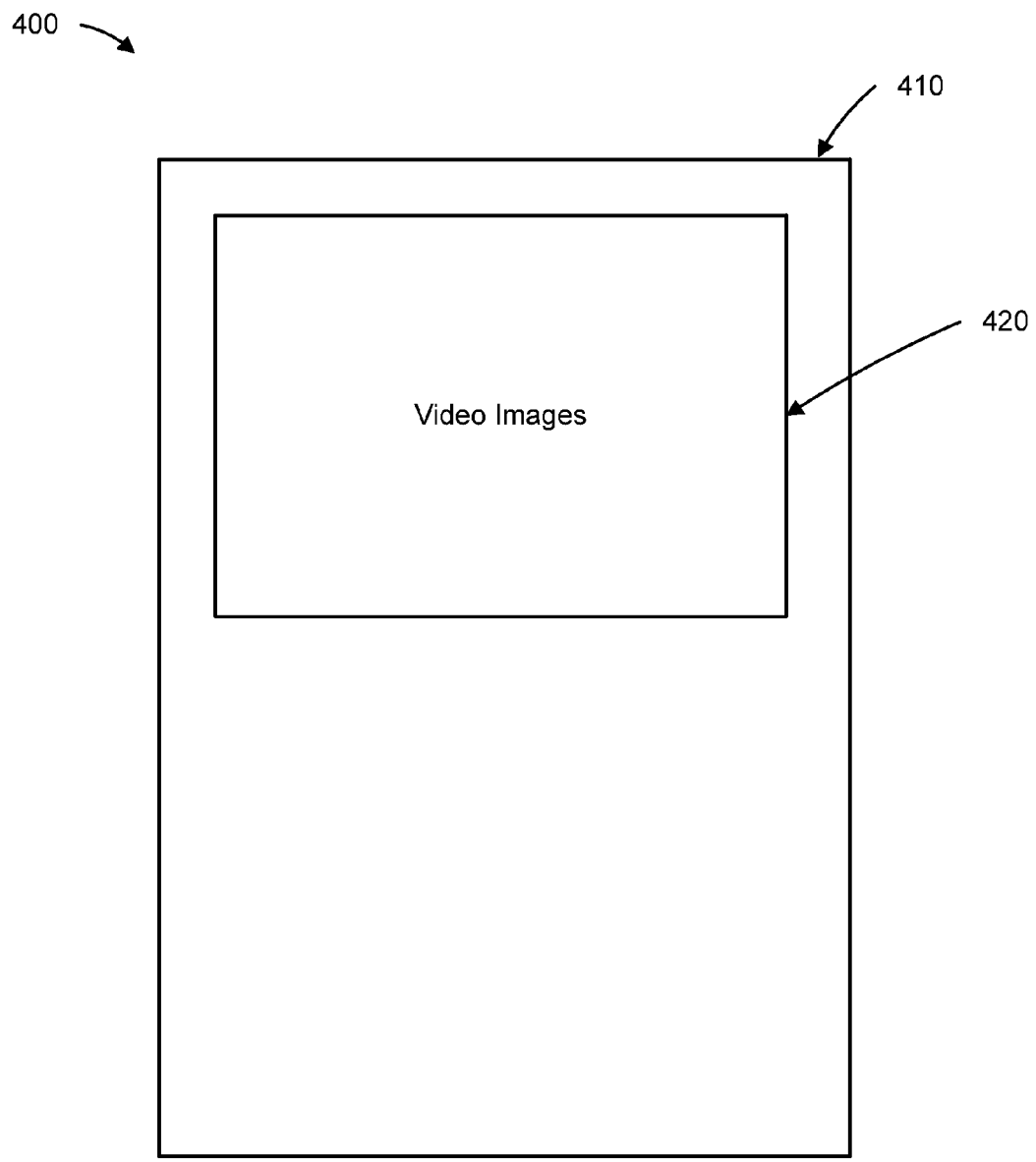
FIG. 4 is an illustration depicting one embodiment of an apparatus displaying a visual signal.

FIG. 4 is an illustration depicting one embodiment 400 of an apparatus including a display 410 displaying a visual signal. In one embodiment 400, the dynamic visual signal 420 may include a frame-by-frame video 420 of authentication images. In another embodiment, a dynamic visual signal 420 may include stepping through authentication images at a slow rate. For example, a slow rate may include one authentication image per second. In another embodiment, a dynamic visual signal 420 may include a video displaying frames at 10 frames per second or faster, however an authentication image may be displayed in 100 sequential frames or more, so that the authentication image appears to be displayed for longer than one frame of the video 420.

In one embodiment, a user of an apparatus may enter an authentication token during presentation of the video 420. For example, a user may enter an authentication token, such as a swipe on the screen at a predetermined time during the video. As previously described, an authentication token may include an input to the computing device at a certain time during the video. In this way, a user of the computing device would have to perform the correct authentication token as well as perform the correct authentication token at the correct time. Requiring multiple aspects of an authentication token may enhance security at the computing device.

Figure 5A:
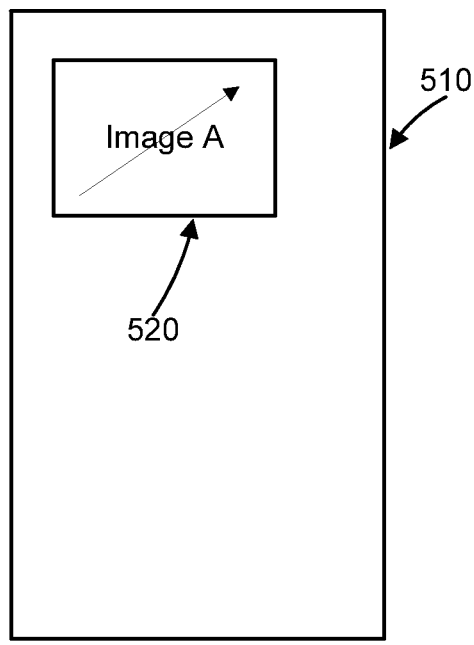
FIG. 5A is an illustration depicting one embodiment of an apparatus displaying a dynamic visual signal.

FIG. 5A is an illustration depicting one embodiment of an apparatus 510 displaying a dynamic visual signal 520. In one embodiment, the dynamic visual signal includes an authentication image, Image A 520. In this embodiment, the authentication image 520 may be displayed in an upper left corner of the apparatus 510. A user may provide an authentication token including a swipe from a bottom left to a top right of the authentication image. Of course, other locations and orientations can be used, as will be described in later figures.

Figure 5B:
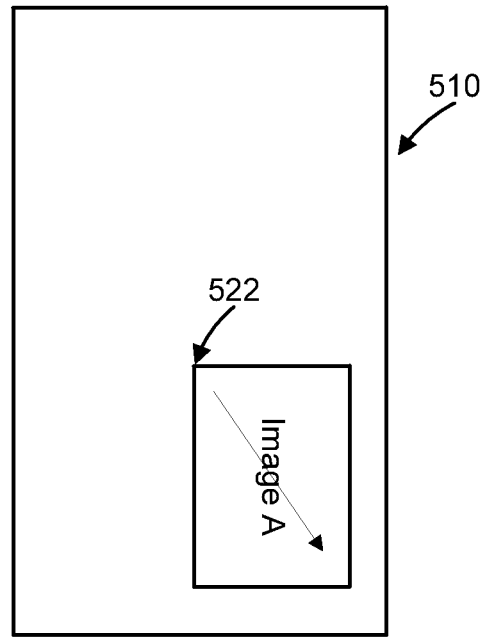
FIG. 5B is an illustration depicting one embodiment of an apparatus displaying a dynamic visual signal.

FIG. 5B is an illustration depicting one embodiment of an apparatus displaying a dynamic visual signal 520. In one embodiment, the dynamic visual signal includes an authentication image, Image A 522. In this embodiment, the authentication image 522 may be displayed in a lower right corner of a display for the apparatus 510. Furthermore, a display module 120, or a generation module 210 may rotate the authentication image 522 90 degrees clockwise. Therefore, an authentication token may be modified to include swiping the image A 522 from a top left of the image 522 to a lower right of the image 522. In one embodiment, the authentication token is oriented relative to the authentication image. In another embodiment, the authentication token may be oriented relative to a display 510 for the apparatus.

For example, because an authentication image may be rotated by a generation module 210 or a display module 120, an authentication token may also be rotated by a similar amount. However, in another example, an authentication image may be rotated by a generation module 210 or a display module 120, and an authentication token may not be modified. Therefore, there is no limitation or requirement that the authentication image and an authentication token be similar modified.

Figure 5C:
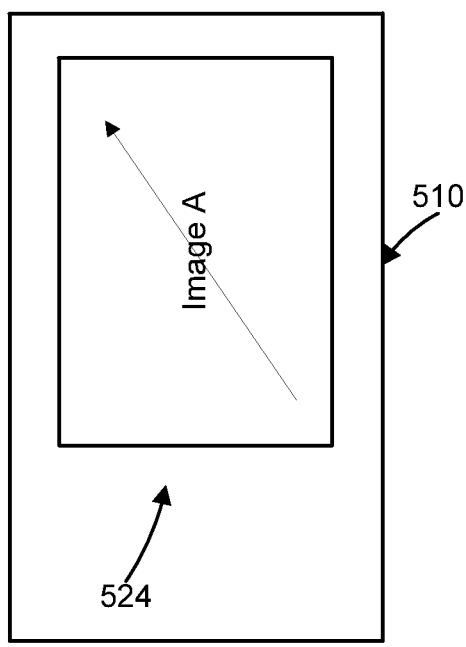
FIG. 5C is an illustration depicting one embodiment of an apparatus displaying a dynamic visual signal.

FIG. 5C is an illustration depicting one embodiment of an apparatus with a display 510 for displaying a dynamic visual signal. In one embodiment, a display module 120 may present a visual signal that includes an authentication image 524 having been increase in size, as well as rotated counter-clockwise 90 degrees. Therefore, in one embodiment, a display module 120 may present or a generation module 210 may generate a dynamic visual signal that includes two or more modifications to an authentication image. In another embodiment, an authentication module 130 may perform similar modification to an authentication token. This may allow a generation module 130 to perform multiple modifications to an authentication image, and may allow an authentication module 130 to authenticate actions from a user, without requiring a user to demonstrate each potential modification.

Therefore, in one embodiment, a user may configure one authentication image, and one authentication token, and a display module may perform many modifications to the authentication image, and an authentication module can perform similar modifications to an authentication token. In this embodiment, a user may perform an authentication token relative to the authentication image, based on many modifications, however the user may only have configured the one authentication image and one authentication token.

Figure 6A:
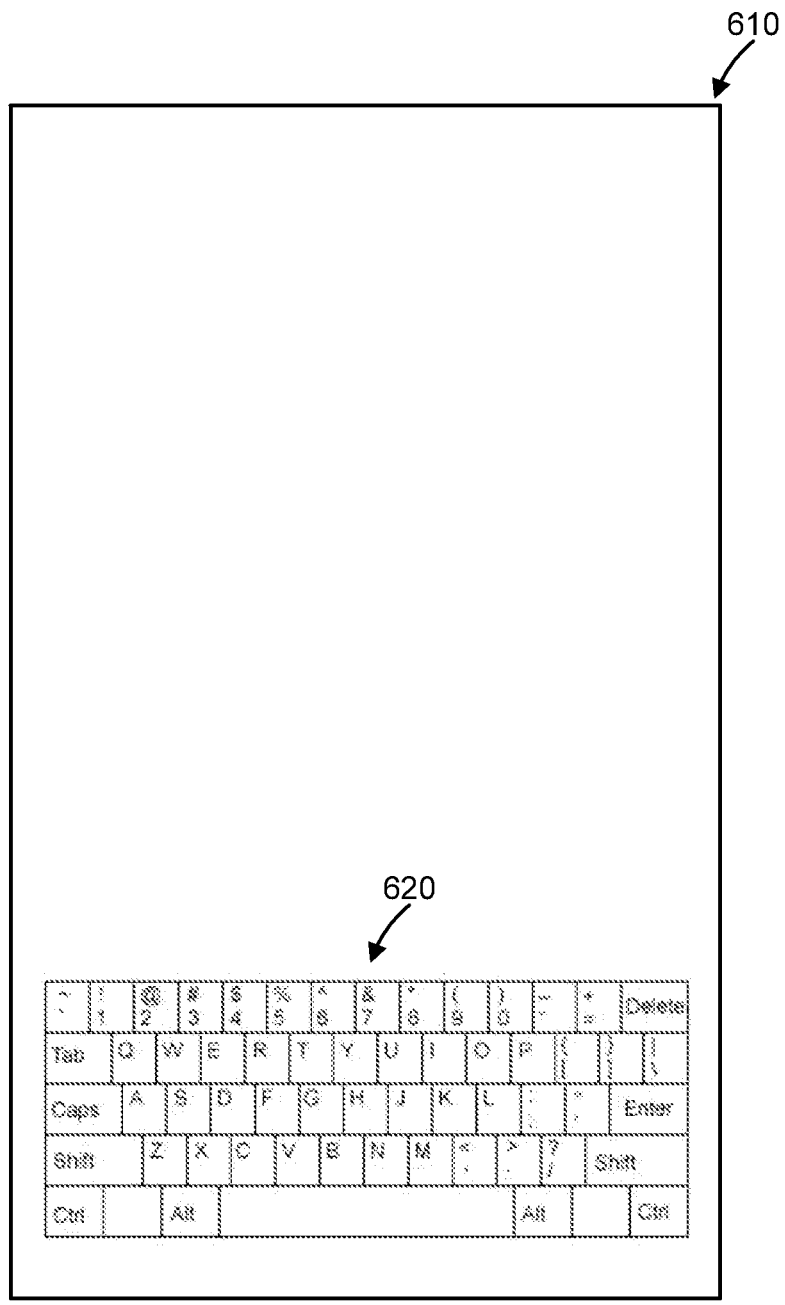
FIG. 6A is an illustration depicting one embodiment of an apparatus displaying a QWERTY keyboard.

FIG. 6A is an illustration depicting one embodiment of an apparatus with a display 610 displaying a QWERTY keyboard 620. In one embodiment, a display module 120 may present a dynamic image that includes a keyboard. The display module 120 may present the keyboard in response to an authentication request. A user of the apparatus may provide an authentication token based on the dynamic visual signal. For example, a user may enter a passphrase using the keyboard. In other examples, the keyboard may support other languages, or may support other symbols for entering a sequence of symbols, letters, or the like.

Figure 6B:
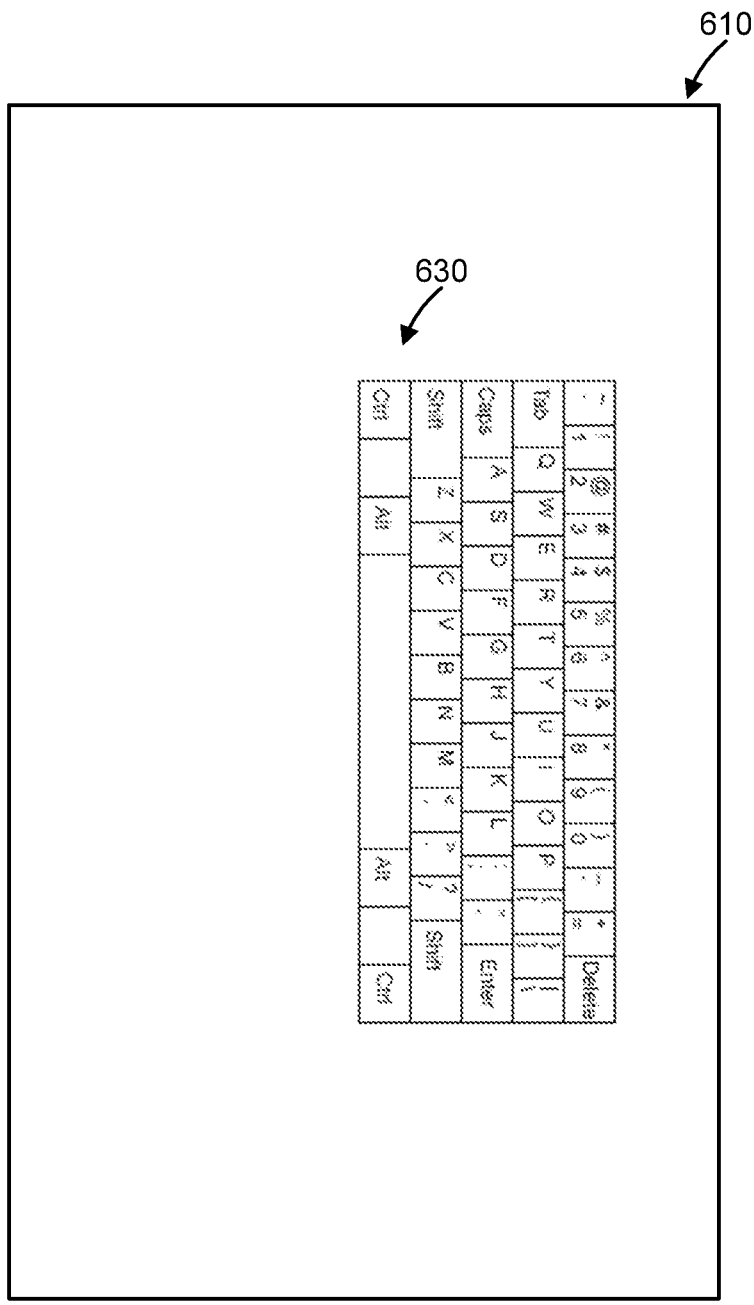
FIG. 6B is an illustration depicting one embodiment of an apparatus displaying a modified keyboard.

FIG. 6B is an illustration depicting one embodiment of an apparatus displaying a modified keyboard. In one embodiment, a modified keyboard may include a QWERTY keyboard that has been rotated and moved to an alternate location. In another embodiment, a modified keyboard may include a QWERTY keyboard that has been resized to be larger or smaller than a previous keyboard. This may help prevent other users of a computing device from determining an authentication token based on observing an owner of the computing device, because the keyboard may be in a different place each time the owner authenticates to the computing device.

In another embodiment, a different keyboard may be used. For example, a display module 120 may present a visual signal that includes a keyboard with keys ordered alphabetically, or phonetically, or in another way, or the like.

Figure 6C:
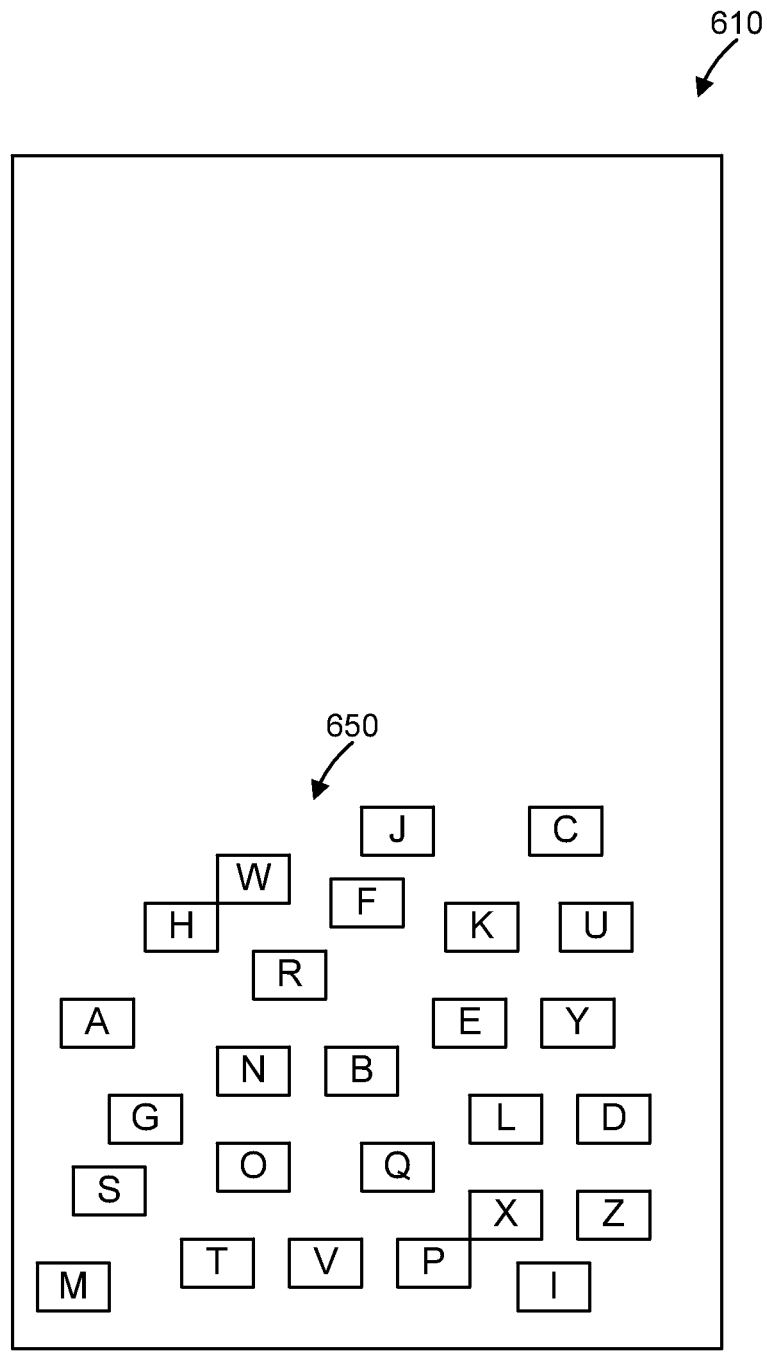
FIG. 6C is an illustration depicting one embodiment of an apparatus displaying a modified keyboard.

FIG. 6C is an illustration depicting one embodiment of an apparatus with a display 610 displaying a visual signal that includes a modified keyboard 650. In one embodiment, a modified keyboard 650 need not resemble a specific keyboard at all. Therefore, a modified keyboard 650 may also include a selection of keys, and may not include an entire keyboard. In one embodiment, a selection of keys may be placed randomly on the display 610. In another embodiment, a user may provide an authentication token by indicating a sequence of letter or symbols indicated on the keys. In one embodiment, a modified keyboard may include a generation module 210 moving keys of the keyboard to alternate locations compared with previous authentication requests.

In another embodiment, a passphrase may require a limited number of characters. Therefore, in one embodiment, a modified keyboard may only display a subset of keys. In one example, a modified keyboard may include seven different letters. For example, a passphrase may be "password." Therefore, in one example, a modified keyboard may only include the seven letters required for a user to provide the passphrase or the authentication token. Of course, this is not necessarily the case. In another example, the modified keyboard may include more characters that those required for a user to provide an authentication token. In another example, additional keys not required for a user to provide an authentication token may enhance the security of the computing device.

Figure 7:
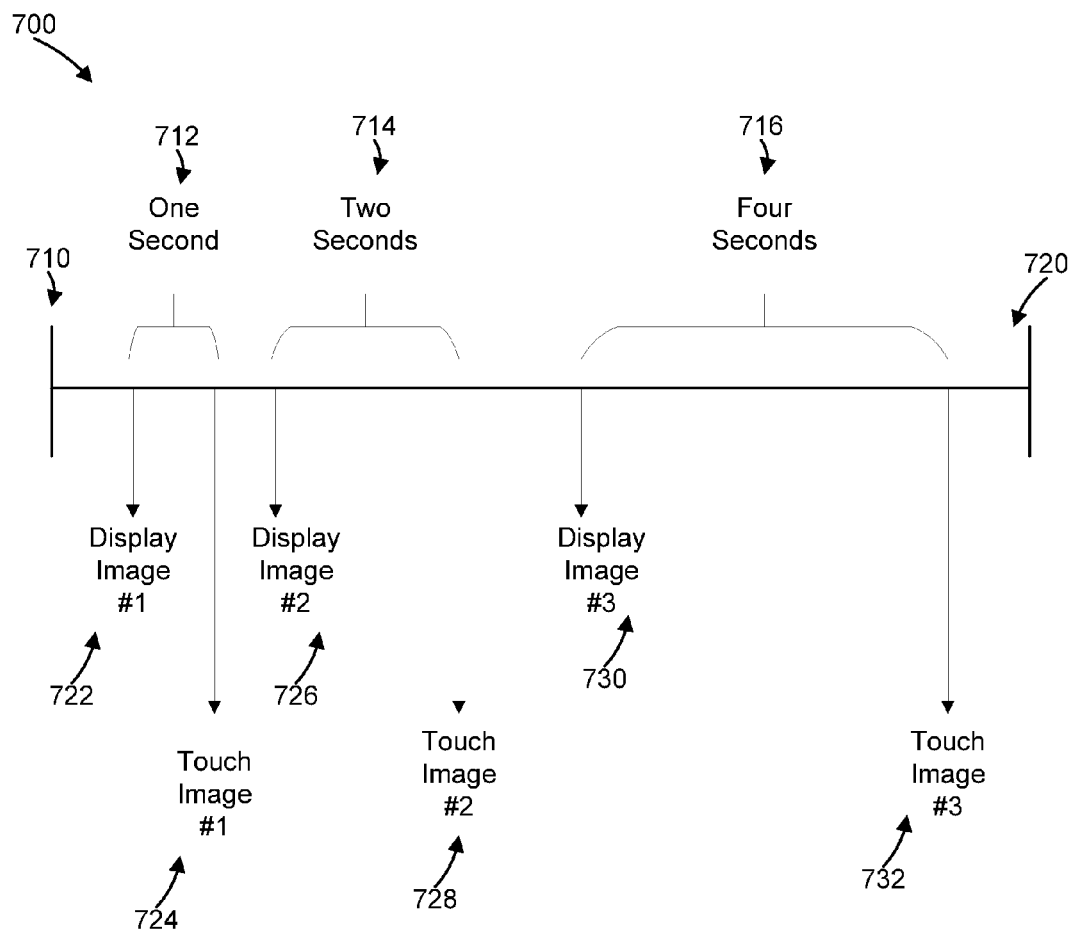
FIG. 7 is a sequence diagram depicting one embodiment of a sequence of touches including time restrictions.

FIG. 7 is a sequence diagram depicting one embodiment 700 of a sequence of touches including time restrictions. In one embodiment, a visual signal may suggest a sequence of touches at a touchscreen of an apparatus. In another embodiment, the authentication token may include the sequence of touches. In one embodiment, an authentication token may incorporate time delays between respective touches of the sequence, or require other time elements. For example, certain portions of an authentication token may have to be provided at specific times in the sequence of touches in order to satisfy an authentication requirement.

In one example, a sequence of authentication images may begin at time index 710, and conclude at time index 720. In another embodiment, a display module 120 may present a dynamic visual signal that includes a display image #1 722. A user may wait for one second 712 before providing 724 a portion of an authentication token. A display module 120 may then present a second dynamic visual signal that includes a display image #2 726. A user may wait for two seconds 714 before providing another portion of an authentication token by touching 728 the second visual signal. A display module 120 may then present a third dynamic visual signal that includes a display image #3 730. A user may wait for four seconds 716 before providing a final portion of an authentication token by touching 732.

Therefore, in this example, a user may be required to wait for the corresponding periods of time 712, 714, 716 in order to correctly provide an authentication token. In another example, if a user does not wait for the corresponding time periods 712, 714, 716, the user may not successfully provide the authentication token.

In another embodiment, a display module 120 may present a sequence of images, and an authentication token may include unique input from a user for each image. For example, a display module 120 may present a sequence of three images. In response to a first image, a user may double click or double tap on the image. In response to a second image presented by the display module 120, a user may swipe from left to right on the displayed image. In response to a third image presented by the display module 120, a user may swipe from top to bottom on the displayed image. Therefore, in one embodiment, an authentication token may include different input from a user in response to displaying a sequence of images.

Figure 8:
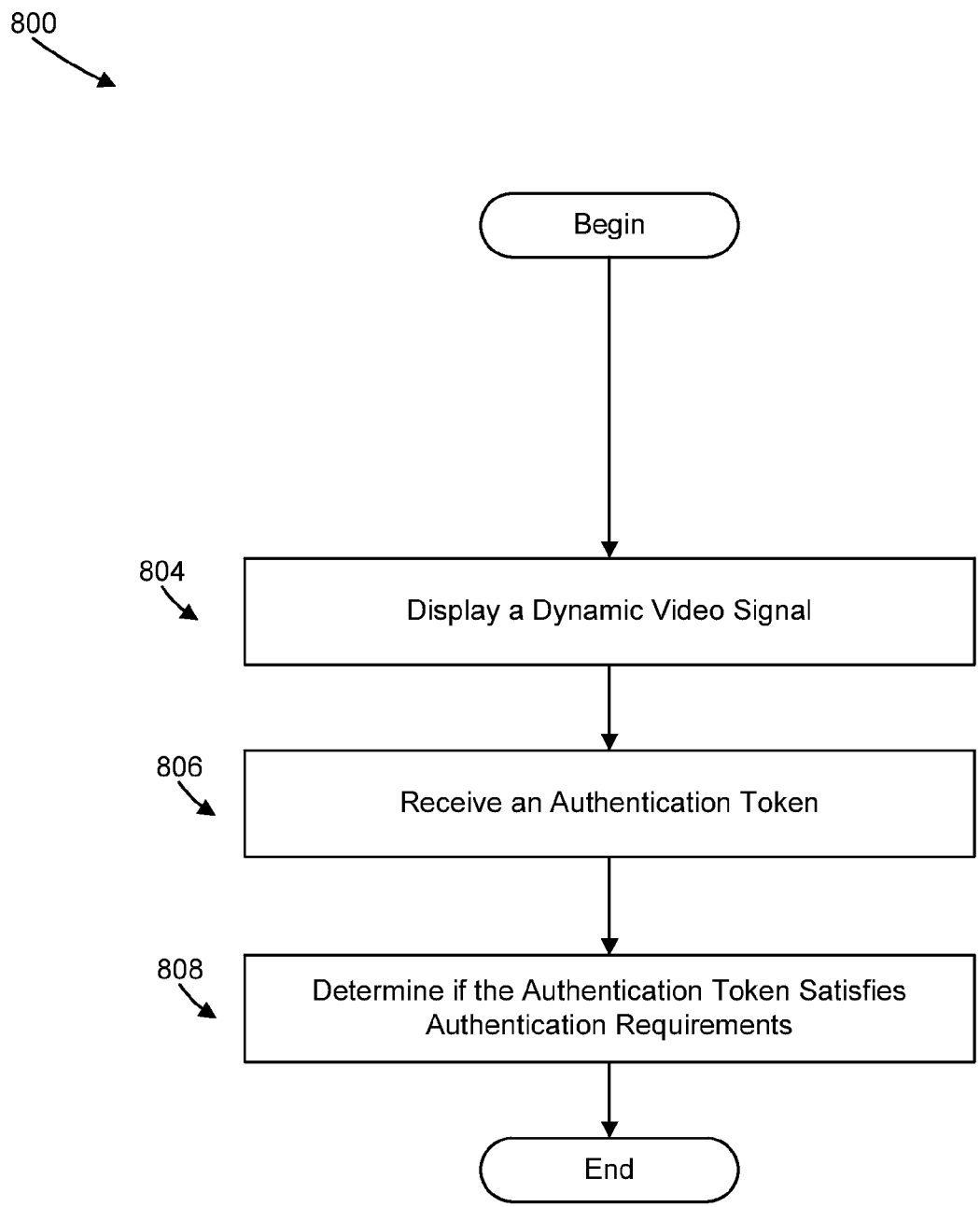
FIG. 8 is a schematic flow chart diagram illustrating one embodiment of a method for visually authenticating to a computing device.

FIG. 8 is a schematic flow chart diagram illustrating one embodiment of a method 800 for visually authenticating to a computing device. In one embodiment, a method 800 begins and a display module 120 may present 804 a dynamic visual signal in response to an authentication request. An authentication module 130 may receive 806 an authentication token based on the dynamic visual signal. An authentication module 130 may determine 808 if the authentication token satisfies authentication requirements.

Figure 9:
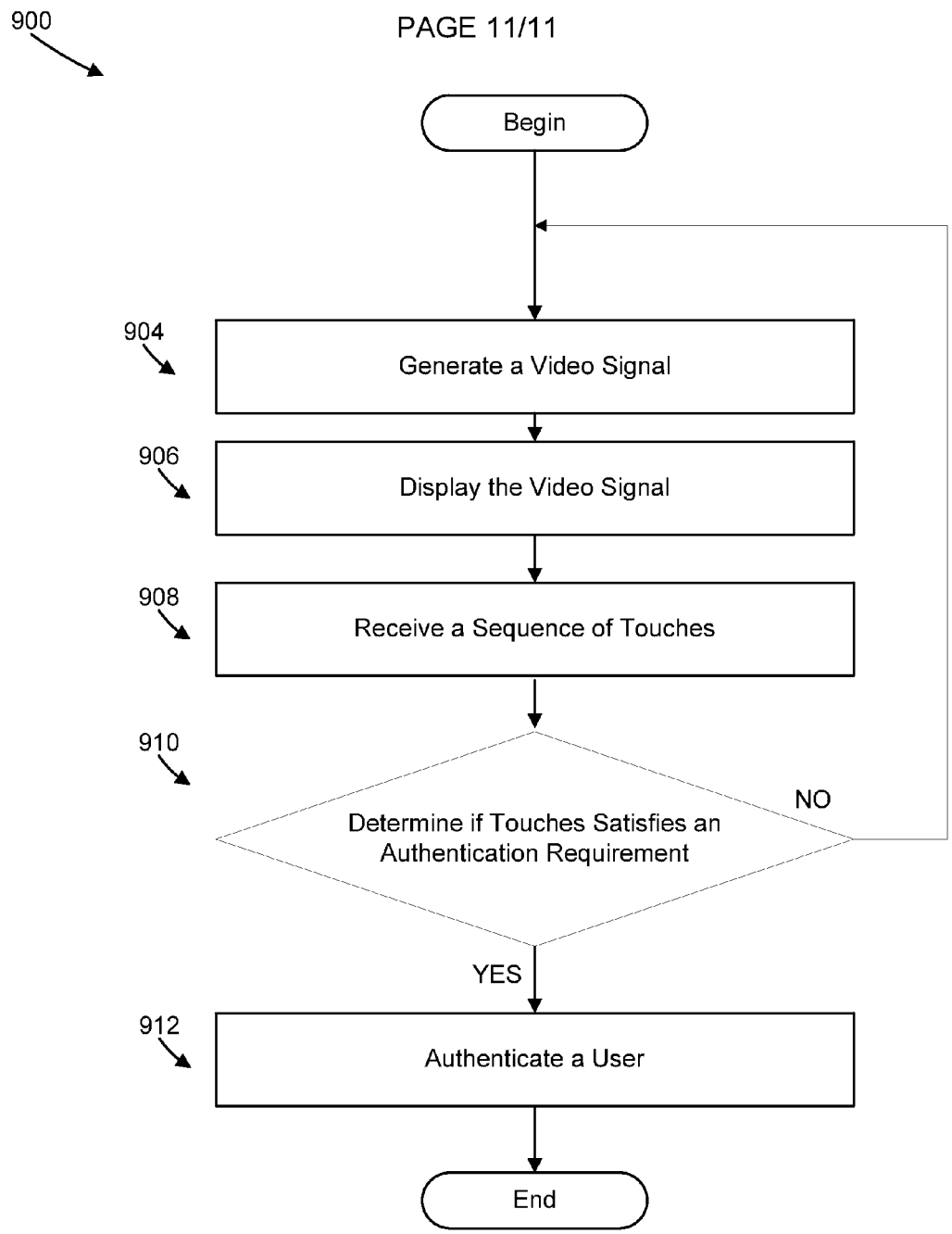
FIG. 9 is a schematic flow chart diagram illustrating one embodiment of a method for visually authenticating to a computing device.

FIG. 9 is a schematic flow chart diagram illustrating one embodiment 900 of a method for visually authenticating to a computing device. In one embodiment, the method 900 begins and a generation module 210 may generate 904 a dynamic visual signal. A display module 120 may present 906 the dynamic visual signal. A display module 120 may receive 908 a sequence of touches at a touchscreen of a computing device. An authentication module 130 may determine 910 if the touches satisfy an authentication requirement. If the touches fail to satisfy an authentication requirement, the method may begin again by receiving 902 another authentication request. If the touches satisfy an authentication requirement an authentication module 130 may authenticate 912 a user of the computing device and the method may end.

What is claimed is:

1. A method comprising:
receiving an authentication request at a computing device;
generating a dynamic visual signal in response to receiving the authentication request, wherein generating the dynamic visual signal comprises modifying at least one image, and modifying the at least one image comprises changing a display location of the at least one image to be different from prior authentications and altering a size of the at least one image, wherein the modifying the at least one image identifies the at least one image out of a plurality of images and suggests an authentication token;
displaying the dynamic visual signal at the display location in response to the authentication request;
receiving the authentication token in response to displaying the dynamic visual signal, wherein the authentication token changes based on the modifying of the at least one image; and
determining whether the authentication token satisfies authentication requirements at the computing device.

2. The method of claim 1, wherein the dynamic visual signal is different than a previous dynamic visual signal associated with the prior authentications.

3. The method of claim 1, wherein generating the dynamic visual signal comprises generating an image of a modified keyboard, the modification comprising moving keys of the keyboard to alternate locations compared with the prior authentications.

4. The method of claim 1, wherein the dynamic visual signal comprises two or more images, one of the two or more images suggesting the authentication token.

5. The method of claim 1, wherein the authentication token comprises a sequence of touches at a touchscreen of the computing device, the sequence of touches incorporating time delays between respective touches.

6. An apparatus comprising:
a processor; and
a memory storing code executable by the processor, the code comprising:
a display module configured to present a dynamic visual signal in response to an authentication request, the dynamic visual signal suggesting an authentication token, wherein the dynamic visual signal is generated by modifying at least one image, and modifying the at least one image comprises changing a display location of the at least one image to be different from prior authentications and altering a size of the at least one image, wherein the modifying the at least one image identifies the at least one image out of a plurality of images and suggests an authentication token;
an authentication module configured to receive the authentication token, the authentication module further configured to determine whether the provided authentication token satisfies authentication requirements at the apparatus, wherein the authentication token changes based on the modifying of the at least one image; and a generation module configured to generate the dynamic visual signal in response to receiving the authentication request.

7. The apparatus of claim 6, wherein the generation module is further configured to modify the dynamic visual signal by one or more of altering a location of an image, and altering an orientation of an image, altering a background color of an image.

8. The apparatus of claim 6, wherein another of the at least one image is received from a remote server.

9. The apparatus of claim 6, wherein the dynamic visual signal comprises an image displaying a modified keyboard.

10. The apparatus of claim 9, wherein the modified keyboard comprises one of a keyboard at a modified location, a rotated keyboard, a keyboard with modified keys, and a keyboard with a modified size.

11. The apparatus of claim 6, wherein the dynamic visual signal suggests a sequence of touches at a touchscreen of the apparatus, the authentication token comprising the sequence of touches.

12. The apparatus of claim 11, wherein the authentication token comprises time delays between touches of the sequence.

13. A program product comprising a non-transitory computer readable storage medium storing machine readable code executable by a processor to perform:

receiving a request to authenticate to a computing device;

generating a dynamic visual signal in response to receiving the request to authenticate, wherein generating the dynamic visual signal comprises modifying at least one image, and modifying the at least one image comprises changing a display location of the at least one image to be different from prior authentications and altering a size of the at least one image, wherein the modifying the at least one image identifies the at least one image out of a plurality of images and suggests an authentication token;

displaying the dynamic visual signal at the display location in response to the request to authenticate;

receiving the authentication token in response to displaying the dynamic visual signal, wherein the authentication token changes based on the modifying of the at least one image; and authenticating to the computing device using the authentication token when the authentication token satisfies authentication requirements at the computing device.

14. The program product of claim 13, wherein the unique visual signal comprises an image displaying a modified keyboard, the modifications comprising one of modifying the location of the keyboard, modifying a rotation of the keyboard, modifying the order of keys of the keyboard, and modifying the size of the keyboard.

15. The program product of claim 13, wherein the authentication token comprises a sequence of touches at a touchscreen of the computing device, the sequence of touches including one or more time delays between touches of the sequence.

* * * * *